(12) United States Patent
Nagase (10) Patent No.: US 11,267,289 B2
(45) Date of Patent: Mar. 8, 2022

(54) TIRE

(71) Applicant: SUMITOMO RUBBER INDUSTRIES, LTD., Hyogo (JP)

(72) Inventor: Hiroki Nagase, Hyogo (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 172 days.

(21) Appl. No.: 16/576,119

(22) Filed: Sep. 19, 2019

(65) Prior Publication Data

US 2020/0094626 A1 Mar. 26, 2020

(30) Foreign Application Priority Data

Sep. 21, 2018 (JP) .............................. JP2018-177771

(51) Int. Cl.
*B60C 11/03* (2006.01)

(52) U.S. Cl.
CPC ....... *B60C 11/03* (2013.01); *B60C 2011/0353* (2013.01); *B60C 2011/0374* (2013.01)

(58) Field of Classification Search
CPC ............. B60C 11/03; B60C 2011/0353; B60C 2011/0374
See application file for complete search history.

(56) References Cited

U.S. PATENT DOCUMENTS

| 10,023,012 | B2* | 7/2018 | Hayashi | ............... | B60C 11/1323 |
| 2013/0220499 | A1* | 8/2013 | Sanae | ................ | B60C 11/1392 |
| | | | | | 152/209.18 |
| 2019/0176531 | A1* | 6/2019 | Murata | ............... | B60C 11/1204 |

FOREIGN PATENT DOCUMENTS

| CN | 101417589 A | * | 4/2009 | ............ | B60C 11/04 |
| JP | 2015131603 A | | 7/2015 | | |

* cited by examiner

*Primary Examiner* — Matthew J Daniels
*Assistant Examiner* — Shibin Liang
(74) *Attorney, Agent, or Firm* — Greenblum & Bernstein, P.L.C.

(57) ABSTRACT

A tire includes having a tread portion that has three land portions defined by two crown main grooves that continuously extend in a tire circumferential direction and that are arranged across a tire equator. The three land portions include two shoulder land portions. At least one of the shoulder land portions includes a plurality of main inclined grooves that extend so as to be inclined. At least one of the main inclined grooves has an inner end and an outer end. The main inclined groove has a steeply-inclined portion that extends so as to be inclined from the inner end toward a tread end, and a gently-inclined portion that extends across the tread end from the outer end at an angle, relative to an tire axial direction, which is less than an angle of the steeply-inclined portion relative thereto. A length of the steeply-inclined portion is greater than a length of the gently-inclined portion.

19 Claims, 4 Drawing Sheets

TIRE

BACKGROUND OF THE INVENTION

Field of the Invention

The present invention relates to a tire, and particularly to a tire in which a tread portion has three land portions defined by two main grooves.

Description of the Background Art

Japanese Laid-Open Patent Publication No. 2015-131603 suggests a tire in which a tread portion includes a pair of circumferential grooves arranged across the tire equator, and lug grooves arranged outward of the circumferential grooves.

SUMMARY OF THE INVENTION

The tire disclosed in Japanese Laid-Open Patent Publication No. 2015-131603 is required to exhibit further improved steering stability and wet performance.

The present invention is made in view of the aforementioned circumstances, and a main object of the present invention is to provide a tire that can exhibit excellent steering stability and wet performance.

The present invention is directed to a tire that includes a tread portion. The tread portion has three land portions defined by two crown main grooves that continuously extend in a tire circumferential direction and that are arranged across a tire equator. The three land portions include two shoulder land portions defined outward of the crown main grooves in a tire axial direction. At least one of the shoulder land portions includes a plurality of main inclined grooves that extend so as to be inclined. At least one of the main inclined grooves has an inner end that terminates in the shoulder land portion in a portion inward of a tread end in the tire axial direction, and an outer end disposed outward of the tread end in the tire axial direction. The main inclined groove has a steeply-inclined portion that extends so as to be inclined from the inner end toward the tread end, and a gently-inclined portion that extends across the tread end from the outer end at an angle, relative to the tire axial direction, which is less than an angle of the steeply-inclined portion relative thereto. A length of the steeply-inclined portion is greater than a length of the gently-inclined portion.

In the tire of the present invention, the steeply-inclined portion is preferably inclined at the angle, relative to the tire axial direction, which is greater than an angle of a reference line that is a straight line connecting between both ends of a groove center line of the main inclined groove, and the gently-inclined portion is preferably inclined at the angle, relative to the tire axial direction, which is less than the angle of the reference line.

In the tire of the present invention, the land portions preferably include a crown land portion defined between the two crown main grooves, and a width of the crown land portion in the tire axial direction is preferably 0.60 to 0.70 times a width of each shoulder land portion in the tire axial direction.

In the tire of the present invention, an angle of the steeply-inclined portion relative to the tire axial direction is preferably 60 to 70°.

In the tire of the present invention, the shoulder land portion preferably includes the two main inclined grooves adjacent to each other in the tire circumferential direction, and a first inclined sub-groove disposed therebetween. The first inclined sub-groove preferably extends across the tread end.

In the tire of the present invention, the first inclined sub-groove preferably extends at an angle, relative to the tire axial direction, which is less than the angle of the steeply-inclined portion relative thereto.

In the tire of the present invention, a rotation direction is preferably designated for the tread portion, and a distance from the first inclined sub-groove to the main inclined groove disposed forward thereof in the rotation direction is preferably less than a distance from the first inclined sub-groove to the main inclined groove disposed backward thereof in the rotation direction, on the tread end.

In the tire of the present invention, the main inclined groove is preferably curved such that a groove center line projects backward in the rotation direction, and the first inclined sub-groove is preferably curved such that a groove center line projects forward in the rotation direction.

In the tire of the present invention, the shoulder land portion preferably includes a second inclined sub-groove disposed outward of the first inclined sub-groove in the tire axial direction.

In the tire of the present invention, the tread portion has three land portions defined by two crown main grooves that continuously extend in a tire circumferential direction and that are arranged across a tire equator. The three land portions include two shoulder land portions defined outward of the crown main grooves in a tire axial direction.

At least one of the shoulder land portions includes a plurality of main inclined grooves that extend so as to be inclined. At least one of the main inclined grooves has an inner end that terminates in the shoulder land portion in a portion inward of a tread end in the tire axial direction, and an outer end disposed outward of the tread end in the tire axial direction. The main inclined groove has a steeply-inclined portion that extends so as to be inclined from the inner end toward the tread end, and a gently-inclined portion that extends across the tread end from the outer end at an angle, relative to the tire axial direction, which is less than an angle of the steeply-inclined portion relative thereto.

The main inclined groove has the inner end that terminates in the shoulder land portion. Therefore, the stiffness of the shoulder land portion can be sufficiently maintained, and excellent steering stability can be exhibited. The main inclined groove having the gently-inclined portion described above allows the shoulder land portion to maintain lateral stiffness near the tread end. Therefore, during cornering, when the center of the ground contact surface of the tire shifts toward the tread end side, deformation of the shoulder land portion in the tire axial direction is inhibited. Therefore, response to the steering during cornering is linear, and excellent steering stability is exhibited.

The main inclined groove has the outer end disposed outward of the tread end in the tire axial direction. Therefore, water in the groove is moved toward the tread end side during wet running, and excellent drainage performance can be exhibited. In the main inclined groove of the present invention, in particular, the length of the steeply-inclined portion is greater than the length of the gently-inclined portion. Therefore, even when the tire rotation speed is high, water is likely to enter the steeply-inclined portion, and hydroplaning phenomenon can be effectively inhibited.

As described above, the tire of the present invention allows enhancement of steering stability and wet performance.

DESCRIPTION OF THE PREFERRED EMBODIMENTS

One embodiment of the present invention will be described below with reference to the drawings.

Figure 1:
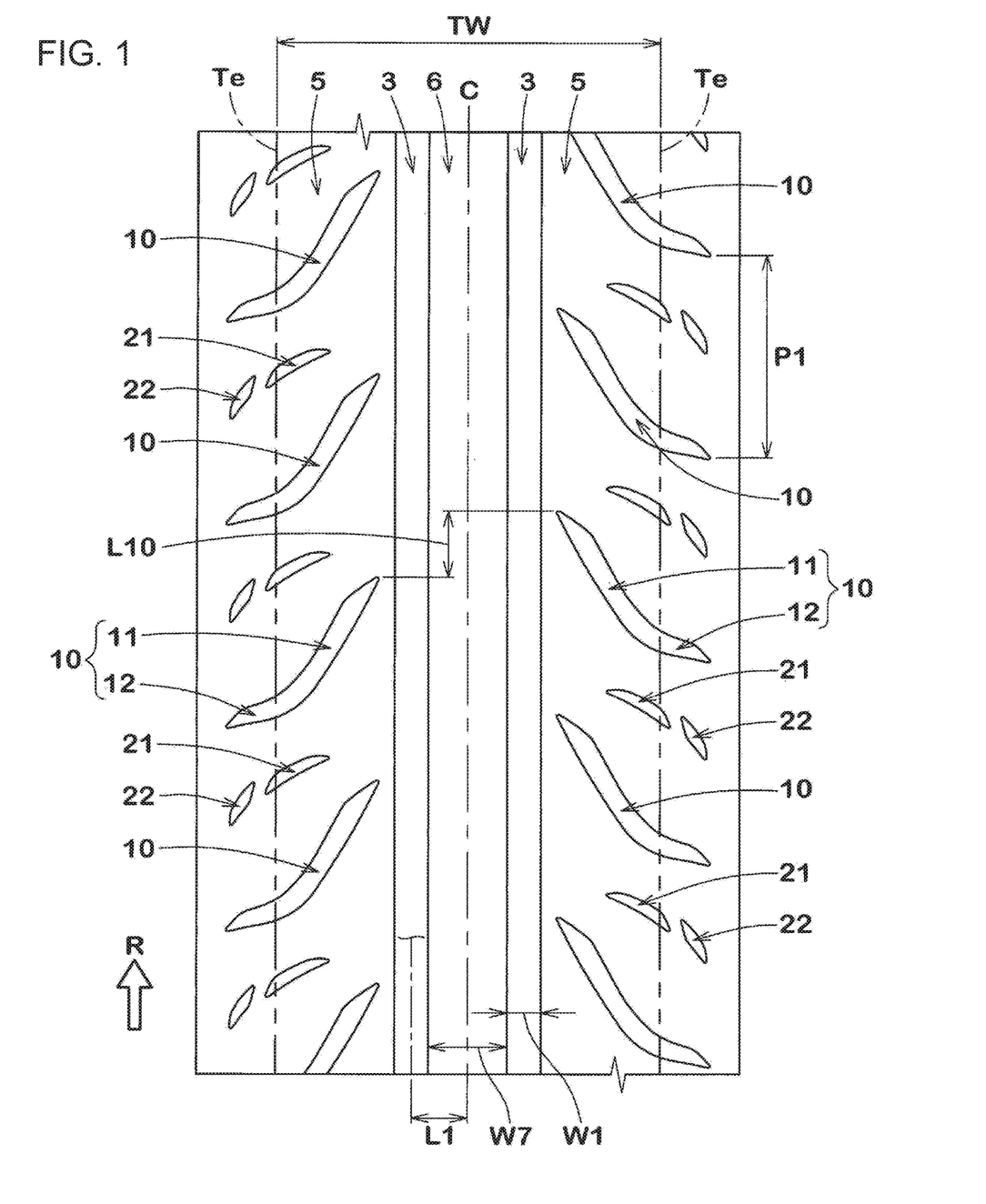
FIG. 1 is a development of a tread portion of a tire according to one embodiment of the present invention.

FIG. 1 is a development of a tread portion 2 of a tire 1 according to one embodiment of the present invention. The tire 1 of the present embodiment is, for example, a pneumatic tire for passenger cars, and is, in particular, a high-performance tire which can run on a public road and is also suited for sport driving on a circuit and the like.

The tire 1 of the present embodiment has, for example, a directional pattern with which a rotation direction R is designated. The rotation direction R is indicated on, for example, a sidewall portion (not shown) by a character or a symbol.

The tread portion 2 of the tire 1 has three land portions defined by two crown main grooves 3 that continuously extend in the tire circumferential direction and that are arranged across a tire equator C. For example, each crown main groove 3 linearly extends along the tire circumferential direction. However, the crown main groove 3 is not limited thereto, and may extend, for example, so as to zigzag or form a wavy shape.

A distance L1, in the tire axial direction, from the tire equator C to the groove center line of the crown main groove 3 is preferably 0.05 to 0.20 times a tread width TW. The tread width TW is a distance, in the tire axial direction, between tread ends Te on both sides. In the case of a pneumatic tire, the tread ends Te are outermost ground contact positions in the tire axial direction in a state where the tire 1 in a normal state contacts with a plane at a camber angle of 0° under a normal load.

The normal state represents a state in which the tire 1 is mounted on a normal rim, is inflated to a normal internal pressure, and is under no load. In the description herein, unless otherwise specified, the dimensions of the components of the tire and the like represent values measured in the normal state.

The "normal rim" represents a rim that is defined by a standard, in a standard system including the standard with which the tire complies, for each tire, and is, for example, the "standard rim" in the JATMA standard, the "Design Rim" in the TRA standard, or the "Measuring Rim" in the ETRTO standard.

The "normal internal pressure" represents an air pressure that is defined by a standard, in a standard system including the standard with which the tire complies, for each tire, and is the "maximum air pressure" in the JATMA standard, the maximum value recited in the table "TIRE LOAD LIMITS AT VARIOUS COLD INFLATION PRESSURES" in the TRA standard, or the "INFLATION PRESSURE" in the ETRTO standard.

The "normal load" represents a load that is defined by a standard, in a standard system including the standard with which the tire complies, for each tire, and is "maximum load capacity" in the JATMA standard, the maximum value recited in the table "TIRE LOAD LIMITS AT VARIOUS COLD INFLATION PRESSURES" in the TRA standard, or the "LOAD CAPACITY" in the ETRTO standard.

For example, a groove width W1 of each crown main groove is preferably 5.0% to 15.0% of the tread width TW, and more preferably 5.0% to 10.0% of the tread width TW. The crown main groove 3 preferably has, for example, a groove depth of 4 to 10 mm in the case of a tire for a passenger car.

The three land portions include two shoulder land portions 5 defined outward of the crown main grooves 3 in the tire axial direction, and a crown land portion 6 defined between the two crown main grooves 3.

Figure 2:
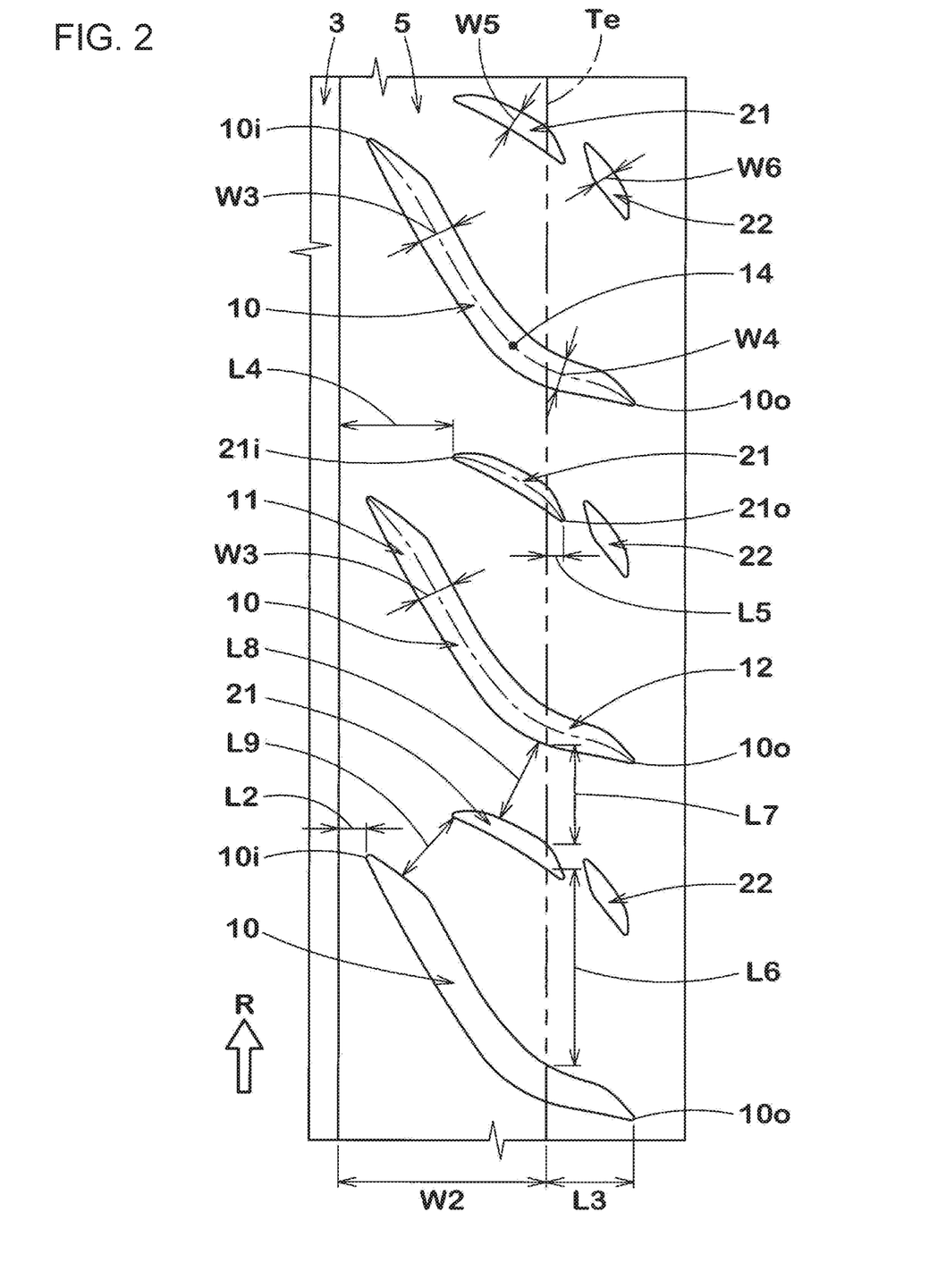
FIG. 2 is an enlarged view of a shoulder land portion shown in FIG. 1.

FIG. 2 is an enlarged view of the shoulder land portion 5. As shown in FIG. 2, a width W2, in the tire axial direction, of a ground contact surface of the shoulder land portion 5 is, for example, 0.25 to 0.35 times the tread width TW.

A plurality of main inclined grooves 10 that extend so as to be inclined are disposed in at least one of the shoulder land portions 5. For example, each main inclined groove 10 extends across the center position, in the tire axial direction, of the ground contact surface of the shoulder land portion 5.

At least one of the main inclined grooves 10 has an inner end 10i that terminates in the shoulder land portion 5 in a portion inward of the tread end Te in the tire axial direction, and an outer end 10o disposed outward of the tread end Te in the tire axial direction. The main inclined groove 10 of the present embodiment is inclined backward in the rotation direction R of the tire from the inner end 10i toward the tread end Te side.

In the present embodiment, no grooves and no sipes are disposed between the crown main groove 3 and the inner end 10i. For example, a distance L2, in the tire axial direction, from the groove edge of the crown main groove 3 to the inner end 10i is preferably 0.10 to 0.20 times the width W2, in the tire axial direction, of the shoulder land portion 5.

For example, a distance L3, in the tire axial direction, from the tread end Te to the outer end 10o is preferably 0.35 to 0.45 times the width W2 of the ground contact surface of the shoulder land portion 5.

The main inclined groove 10 includes a steeply-inclined portion 11 that extends so as to be inclined from the inner end 10i toward the tread end Te side, and a gently-inclined portion 12 that extends across the tread end Te from the outer end 10o at an angle, relative to the tire axial direction, which is less than an angle of the steeply-inclined portion 11 relative thereto. The length of the steeply-inclined portion 11 is greater than the length of the gently-inclined portion 12. Each length is measured as, for example, a so-called peripheral length along the groove center line.

The main inclined groove 10 has the inner end 10i that terminates in the shoulder land portion 5. Therefore, the stiffness of the shoulder land portion 5 can be maintained, and excellent steering stability can be exhibited. The main inclined groove 10 having the gently-inclined portion 12 described above allows the shoulder land portion 5 to maintain lateral stiffness near the tread end Te. Therefore, during cornering, when the center of the ground contact surface of the tire shifts toward the tread end Te side, deformation of the shoulder land portion 5 in the tire axial direction is inhibited. Therefore, response to the steering during cornering is linear, and excellent steering stability is exhibited.

The main inclined groove 10 has the outer end 10o disposed outward of the tread end Te in the tire axial direction. Therefore, water in the groove is moved toward the tread end Te side during wet running, and excellent drainage performance can be exhibited. In the main inclined groove 10 of the present invention, in particular, the length of the steeply-inclined portion 11 is greater than the length of the gently-inclined portion 12. Therefore, even when the tire rotation speed is high, water is likely to enter the steeply-inclined portion 11, and hydroplaning phenomenon can be effectively inhibited.

Figure 3:
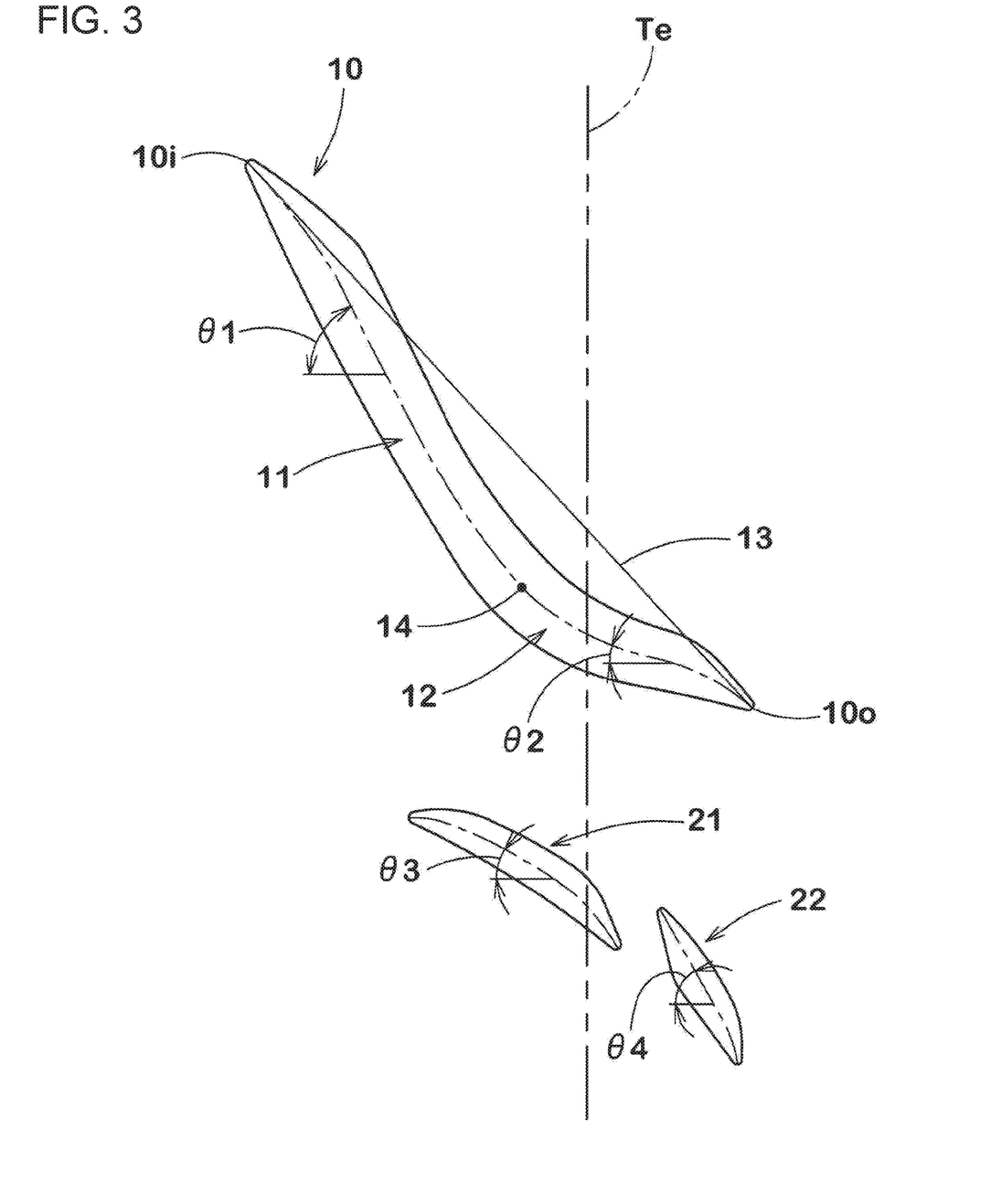
FIG. 3 is an enlarged view of a main inclined groove, a first inclined sub-groove, and a second inclined sub-groove shown in FIG. 2.

FIG. 3 is an enlarged view of the main inclined groove 10. As shown in FIG. 3, in the main inclined groove 10, for example, the groove center line is smoothly curved. In the main inclined groove 10 of the present embodiment, the groove center line is curved so as to project backward in the rotation direction R of the tire.

For example, the steeply-inclined portion 11 is inclined at an angle, relative to the tire axial direction, which is greater than an angle of a reference line 13 that is a straight line connecting between both ends of the groove center line of the main inclined groove 10. The gently-inclined portion 12 is inclined at an angle, relative to the tire axial direction, which is less than the angle of the reference line 13. A boundary 14 between the steeply-inclined portion 11 and the gently-inclined portion 12 on the groove center line of the main inclined groove 10 corresponds to a point through which the tangent line parallel to the reference line passes.

An angle θ1 of the steeply-inclined portion 11 relative to the tire axial direction is, for example, greater than 45°. For example, the angle θ1 of the steeply-inclined portion 11 of the present embodiment is preferably 60 to 700.

As shown in FIG. 2, the length of the steeply-inclined portion 11 is, for example, less than one pitch length P1 (shown in FIG. 1, the same applies to the following description) at which the main inclined grooves 10 are aligned in the tire circumferential direction. For example, the length of the steeply-inclined portion 11 is preferably 0.65 to 0.85 times the one pitch length P1. For example, the length of the steeply-inclined portion 11 is preferably 5 to 9 times the groove width W3 thereof. The steeply-inclined portion 11 having such a structure contributes to well-balanced enhancement of steering stability and wet performance. The length of the steeply-inclined portion 11 is a peripheral length from the inner end 10i of the main inclined groove 10 to the boundary 14.

From the same viewpoint, for example, the groove width W3 of the steeply-inclined portion 11 is preferably less than the groove width W1 (shown in FIG. 1, the same applies to the following description) of the crown main groove 3. Specifically, for example, the groove width W3 of the steeply-inclined portion 11 is preferably 0.55 to 0.65 times the groove width W1 of the crown main groove 3.

As shown in FIG. 3, an angle θ2 of the gently-inclined portion 12 relative to the tire axial direction is, for example, less than 30°. For example, the angle θ2 of the gently-inclined portion 12 of the present embodiment is preferably 15 to 25°.

For example, the length of the gently-inclined portion 12 is preferably 0.25 to 0.35 times the one pitch length P1 at which the main inclined grooves 10 are aligned in the tire circumferential direction. The length of the gently-inclined portion 12 is preferably 0.50 to 0.70 times the length of the steeply-inclined portion 11. The gently-inclined portion 12 having such a structure allows wet performance to be enhanced while maintaining stiffness near the tread end Te. The length of the gently-inclined portion 12 is a peripheral length from the boundary 14 to the outer end 10o.

As shown in FIG. 2, for example, a groove width W4 of the gently-inclined portion 12 is preferably less than the groove width W1 of the crown main groove 3. Specifically, for example, the groove width W4 of the gently-inclined portion 12 is preferably 0.50 to 0.60 times the groove width W1 of the crown main groove 3. The gently-inclined portion 12 of the present embodiment has a groove width that gradually decrease from the boundary 14 to the outer end 10o. The gently-inclined portion 12 having such a structure contributes to obtaining linear response to steering.

The shoulder land portion 5 of the present embodiment includes a plurality of first inclined sub-grooves 21 and a plurality of second inclined sub-grooves 22, in addition to the main inclined grooves 10.

Each first inclined sub-groove 21 is disposed between the two main inclined grooves 10 adjacent to each other in the tire circumferential direction. The first inclined sub-groove 21 is, for example, inclined in the same direction as the inclining direction of the main inclined groove 10. That is, the first inclined sub-groove 21 extends so as to be inclined backward in the rotation direction R of the tire, from an inner end 21i on the tire equator C side, toward the tread end Te side.

For example, the inner end 21i of the first inclined sub-groove 21 is preferably disposed outward of the inner end 10i of the main inclined groove 10 in the tire axial direction. In a more preferable mode, the inner end 21i of the first inclined sub-groove 21 is disposed inward of the boundary 14 in the main inclined groove 10 in the tire axial direction. A distance L4, in the tire axial direction, from the groove edge of the crown main groove 3 to the inner end 21i of the first inclined sub-groove 21 is, for example, 0.50 to 0.60 times the width W2 of the ground contact surface of the shoulder land portion 5.

The first inclined sub-groove 21 has an outer end 21o disposed outward of the tread end Te in the tire axial direction. Thus, the first inclined sub-groove 21 extends across the tread end Te. The outer end 21o of the first inclined sub-groove 21 is preferably disposed inward of the outer end 10o of the main inclined groove 10 in the tire axial direction. For example, a distance L5, in the tire axial direction, from the outer end 21o of the first inclined sub-groove 21 to the tread end Te is preferably 0.05 to 0.10 times the width W2 of the ground contact surface of the shoulder land portion 5.

For example, the length of the first inclined sub-groove 21 is preferably less than the length of the steeply-inclined portion 11 of the main inclined groove 10. For example, the length of the first inclined sub-groove 21 of the present embodiment is preferably 0.25 to 0.40 times the one pitch length P1. The first inclined sub-groove 21 having such a structure contributes to well-balanced enhancement of steering stability and wet performance during cornering.

For example, the length of the first inclined sub-groove 21 is 5 to 7 times a groove width W5 thereof. A ratio of the length of the first inclined sub-groove 21 to the groove width thereof is preferably less than a ratio of the length of the main inclined groove 10 to the groove width thereof.

As shown in FIG. 3, for example, the first inclined sub-groove 21 preferably extends at an angle, relative to the tire axial direction, which is less than the angle of the steeply-inclined portion 11. An angle θ3 of the first inclined sub-groove 21 relative to the tire axial direction is, for example, less than 45°. For example, the angle θ3 of the first inclined sub-groove 21 of the present embodiment is preferably 20 to 30°.

As shown in FIG. 2, the groove width W5 of the first inclined sub-groove 21 is, for example, less than the groove width W1 of the crown main groove 3. The groove width W5 of the first inclined sub-groove 21 is, for example, 0.30 to 0.40 times the groove width W1 of the crown main groove 3. The first inclined sub-groove 21 having such a structure contributes to well-balanced enhancement of steering stability and wet performance.

In the first inclined sub-groove 21, the groove center line is preferably curved so as to project forward in the rotation direction R. The first inclined sub-groove 21 having such a structure and the main inclined groove 10 can act to exert frictional force in multiple directions in conjunction with each other.

On the tread end Te, a distance L7 from the first inclined sub-groove 21 to the main inclined groove 10 disposed forward thereof in the rotation direction R is preferably less than a distance L6 from the first inclined sub-groove 21 to the main inclined groove 10 disposed backward thereof in the rotation direction R. Specifically, the distance L7 is 0.40 to 0.60 times the distance L6.

In a more preferable mode, a minimal distance L9 from the groove edge of the first inclined sub-groove 21 to the groove edge of the main inclined groove 10 that is adjacently disposed backward of the first inclined sub-groove 21 in the rotation direction R is 0.80 to 1.20 times a minimal distance L8 from the groove edge of the first inclined sub-groove 21 to the groove edge of the main inclined groove 10 that is adjacently disposed forward of the first inclined sub-groove 21 in the rotation direction R. Such an arrangement of the first inclined sub-groove 21 can reduce uneven wear around the first inclined sub-groove 21.

The second inclined sub-groove 22 is disposed between the two main inclined grooves 10 adjacent to each other in the tire circumferential direction. The second inclined sub-groove 22 is, for example, inclined in the same direction as the inclining direction of the main inclined groove 10. That is, the second inclined sub-groove 22 extends so as to be inclined backward in the rotation direction R of the tire, from an inner end 22i on the tire equator C side, toward the outer side in the tire axial direction.

The second inclined sub-groove 22 is, for example, disposed outward of the first inclined sub-groove 21 in the tire axial direction. In the present embodiment, the entirety of the second inclined sub-groove 22 is disposed outward of the tread end Te in the tire axial direction. In a more preferable mode, the second inclined sub-groove 22 is disposed inward of the outer end 10o of the main inclined groove 10 in the tire axial direction. The second inclined sub-groove 22 having such a structure allows steering stability to be improved since the second inclined sub-groove 22 is disposed outward of the ground contact surface during straight running, and allows wet performance to be enhanced during cornering in which high ground contact pressure acts to enlarge the ground contact surface.

For example, the length of the second inclined sub-groove 22 is preferably less than the length of the first inclined sub-groove 21. For example, the length of the second inclined sub-groove 22 of the present embodiment is preferably 0.15 to 0.30 times the one pitch length P1.

As shown in FIG. 3, an angle θ4 of the second inclined sub-groove 22 relative to the tire axial direction is preferably greater than 45°. For example, the angle 84 of the second inclined sub-groove 22 relative to the tire axial direction is preferably 60 to 700.

As shown in FIG. 2, for example, a groove width W6 of the second inclined sub-groove 22 is preferably less than the groove width W1 of the crown main groove 3 and the groove width of the main inclined groove 10. For example, the groove width W6 of the second inclined sub-groove 22 is 0.30 to 0.40 times the groove width W1 of the crown main groove 3. The second inclined sub-groove 22 having such a structure allows enhancement of steering stability and wet performance.

For example, an interval between the first inclined sub-groove 21 and the second inclined sub-groove 22 is preferably less than the maximum groove width of the main inclined groove 10. Such an arrangement of the first inclined sub-groove 21 and the second inclined sub-groove 22 effectively enhances wet performance during cornering.

As shown in FIG. 1, in the present embodiment, each of the two shoulder land portions 5 has the above-described main inclined grooves 10 disposed therein, and has the first inclined sub-grooves 21 and the second inclined sub-grooves 22 disposed therein. However, the present invention is not limited to such a mode. At least one of the shoulder land portions 5 may have the above-described grooves.

A group of the grooves disposed in one of the shoulder land portions 5 and a group of the grooves disposed in the other of the shoulder land portions 5 are arranged with a phase difference L10 in the tire circumferential direction. When the phase difference L10 is 0, these two groups of grooves are disposed so as to be line-symmetric with respect to the tire equator C.

For example, the phase difference L10 is preferably greater than the length of the second inclined sub-groove 22. Specifically, the phase difference L10 is 0.25 to 0.40 times the one pitch length P1 at which the main inclined grooves 10 are aligned. In a more preferable mode, the sum of the phase difference L10 and the length of the steeply-inclined portion 11 is preferably greater than the one pitch length P1.

The crown land portion 6 of the present embodiment is, for example, a smooth land portion having no cut portions such as grooves and sipes. The crown land portion 6 having such a structure contributes to exhibiting excellent steering stability.

For well-balanced enhancement of steering stability and wet performance, for example, a width W7 of the crown land portion 6 in the tire axial direction is preferably 0.60 to 0.70 times the width W2 of the shoulder land portion 5 in the tire axial direction.

Although the tire according to one embodiment of the present invention has been described above in detail, the present invention is not limited to the above-described specific embodiment, and various modifications can be made to implement the present invention.

EXAMPLES

Figure 4:
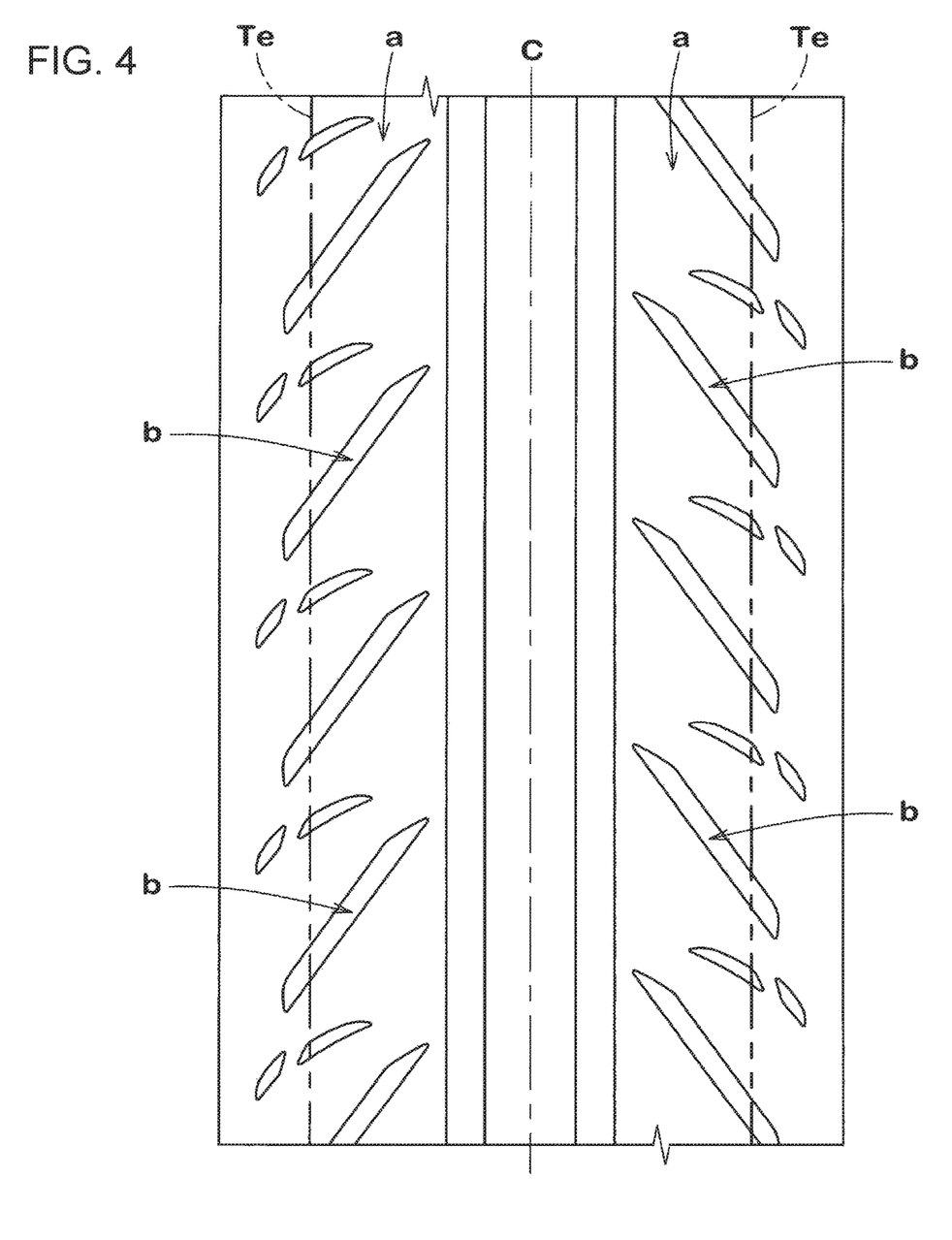
FIG. 4 is a development of a tread portion of a tire according to a comparative example.

A pneumatic tire having the size of 245/40R18 and having a basic pattern shown in FIG. 1 was produced as a sample tire. For a comparative example, a tire in which a plurality of main inclined grooves b each extending at a constant angle relative to the tire axial direction were disposed in shoulder land portions a as shown in FIG. 4, was produced as a sample tire. The tire of the comparative example had substantially the same pattern as shown in FIG. 1 except for the above-described structure. For each test tire, steering stability and wet performance were tested. Specifications common to the test tires and the test method are as described below.

Mounted rim: 18×8.0 J
Tire internal pressure: 230 kPa
Test vehicle: rear-wheel-drive car having an engine displacement of 2000 cc
Tire mounted position: all wheels
<Steering Stability>
When a driver was driving the above-described test vehicle on a circuit track having a dry road surface, sensory evaluation was made by the driver for steering stability. The result is obtained as a score with the score of the comparative example being 100. The greater the value of the score is, the more excellent steering stability is.
<Wet Performance>
When a driver was driving the above-described test vehicle on a circuit track having a wet road surface, sensory evaluation was made by the driver for wet performance. The result is obtained as a score with the score of the comparative example being 100. The greater the value of the score is, the more excellent wet performance is.
The test results are indicated in Table 1.

TABLE 1

|  | Comp. Example | Example 1 | Example 2 | Example 3 | Example 4 | Example 5 | Example 6 | Example 7 | Example 8 |
|---|---|---|---|---|---|---|---|---|---|
| Figure showing tread pattern | FIG. 4 | FIG. 1 | FIG. 1 | FIG. 1 | FIG. 1 | FIG. 1 | FIG. 1 | FIG. 1 | FIG. 1 |
| Length of steeply-inclined portion/one pitch length P1 | — | 0.75 | 0.65 | 0.70 | 0.80 | 0.85 | 0.75 | 0.75 | 0.75 |
| Length of gently-inclined portion/one pitch length P1 | — | 0.30 | 0.30 | 0.30 | 0.30 | 0.30 | 0.20 | 0.25 | 0.35 |
| Steering stability (score) | 100 | 108 | 109 | 108 | 107 | 106 | 108 | 108 | 107 |
| Wet performance (score) | 100 | 103 | 101 | 102 | 103 | 103 | 102 | 103 | 103 |

According to the test results, it can be confirmed that the tires of the examples exhibited excellent steering stability and wet performance.

What is claimed is:

1. A tire comprising
a tread portion, wherein
the tread portion has three land portions defined by two crown main grooves that continuously extend in a tire circumferential direction and that are arranged across a tire equator,
the three land portions include two shoulder land portions defined outward of the crown main grooves in a tire axial direction,
at least one of the shoulder land portions includes a plurality of main inclined grooves that extend so as to be inclined,
at least one of the main inclined grooves has an inner end that terminates in the shoulder land portion in a portion inward of a tread end in the tire axial direction, and an outer end disposed outward of the tread end in the tire axial direction,
the at least one main inclined groove has a steeply-inclined portion that extends so as to be inclined from the inner end toward the tread end, and a gently-inclined portion that extends across the tread end from the outer end at an angle, relative to the tire axial direction, which is less than an angle of the steeply-inclined portion relative thereto, and
a length of the steeply-inclined portion is greater than a length of the gently-inclined portion;
in the shoulder land portion, the plurality of main inclined grooves includes two main inclined grooves adjacent to each other in the tire circumferential direction, and a first inclined sub-groove and a second inclined sub-groove are disposed therebetween,
the first inclined sub-groove extends across the tread end,
the second inclined sub-groove does not extend across the tread end,
the second inclined sub-groove disposed outward of the first inclined sub-groove in the tire axial direction, and
the second inclined sub-groove has a length less than a length of the first inclined sub-groove.

2. The tire according to claim 1, wherein
the steeply-inclined portion is inclined at the angle, relative to the tire axial direction, which is greater than an angle of a reference line that is a straight line connecting between both ends of a groove center line of the at least one main inclined groove, and
the gently-inclined portion is inclined at the angle, relative to the tire axial direction, which is less than the angle of the reference line.

3. The tire according to claim 1, wherein
the land portions include a crown land portion defined between the two crown main grooves, and
a width of the crown land portion in the tire axial direction is 0.60 to 0.70 times a width of each shoulder land portion in the tire axial direction.

4. The tire according to claim 1, wherein an angle of the steeply-inclined portion relative to the tire axial direction is 60 to 70°.

5. The tire according to claim 1, wherein the first inclined sub-groove extends at an angle, relative to the tire axial direction, which is less than the angle of the steeply-inclined portion relative thereto.

6. The tire according to claim 1, wherein
a rotation direction is designated for the tread portion, and
a distance from the first inclined sub-groove to the at least one main inclined groove disposed forward thereof in the rotation direction is less than a distance from the first inclined sub-groove to the at least one main inclined groove disposed backward thereof in the rotation direction, on the tread end.

7. The tire according to claim 6, wherein
the at least one main inclined groove is curved such that a groove center line projects backward in the rotation direction, and
the first inclined sub-groove is curved such that a groove center line projects forward in the rotation direction.

8. The tire according to claim 1, wherein the shoulder land portion includes a second inclined sub-groove disposed outward of the first inclined sub-groove in the tire axial direction.

9. The tire according to claim 1, wherein a length of the gently-inclined portion is 0.25 to 0.35 times one pitch length P1 at which the main inclined grooves are aligned in the tire circumferential direction.

10. The tire according to claim 1, wherein the length of the gently-inclined portion is 0.50 to 0.70 times a length of the steeply-inclined portion.

11. The tire according to claim 1, wherein an interval between the first inclined sub-groove and the second inclined sub-groove is less than the maximum groove width of the main inclined groove.

12. The tire according to claim 1, wherein a phase difference with which a group of the grooves disposed in one of the shoulder land portions and a group of the grooves disposed in the other of the shoulder land portions are arranged is greater than the length of the second inclined sub-groove.

13. The tire according to claim 12, wherein the phase difference is 0.25 to 0.40 times the one pitch length at which the at least one main inclined grooves are aligned.

14. The tire according to claim 12, wherein a sum of the phase difference and the length of the steeply-inclined portion is greater than the one pitch length.

15. The tire according to claim 1, wherein the first inclined sub-groove extends at an angle of less than 45° relative to the tire axial direction and the second inclined sub-groove extends at an angle of greater that 45° to the tire axial direction.

16. The tire according to claim 15, wherein the first inclined sub-groove extends at an angle of 20-30° to the tire axial direction.

17. The tire according to claim 15, wherein the second inclined sub-groove extends at an angle of 60-70° to the tire axial direction.

18. The tire according to claim 15, wherein an interval between the first inclined sub-groove and the second inclined sub-groove is less than a maximum groove width of the at least one main inclined groove.

19. A tire comprising
a tread portion, wherein
the tread portion has three land portions defined by two crown main grooves that continuously extend in a tire circumferential direction and that are arranged across a tire equator,
the three land portions include two shoulder land portions defined outward of the crown main grooves in a tire axial direction,
at least one of the shoulder land portions includes a plurality of main inclined grooves that extend so as to be inclined,
at least one of the main inclined grooves has an inner end that terminates in the shoulder land portion in a portion inward of a tread end in the tire axial direction, and an outer end disposed outward of the tread end in the tire axial direction,
the at least one main inclined groove has a steeply-inclined portion that extends so as to be inclined from the inner end toward the tread end, and a gently-inclined portion that extends across the tread end from the outer end at an angle, relative to the tire axial direction, which is less than an angle of the steeply-inclined portion relative thereto, and
a length of the steeply-inclined portion is greater than a length of the gently-inclined portion;
in the shoulder land portion, the plurality of main inclined grooves includes two main inclined grooves adjacent to each other in the tire circumferential direction, and a first inclined sub-groove and a second inclined sub-groove are disposed therebetween,
the first inclined sub-groove extends across the tread end,
the second inclined sub-groove does not extend across the tread end,
the second inclined sub-groove disposed outward of the first inclined sub-groove in the tire axial direction, and
the second inclined sub-groove has a length less than a length of the first inclined sub-groove in a tread width direction.

* * * * *